(12) United States Patent
Liao et al.

(10) Patent No.: US 6,717,915 B1
(45) Date of Patent: Apr. 6, 2004

(54) METHOD AND APPARATUS FOR DYNAMICALLY CONFIGURING TIMING PARAMETERS FOR WIRELESS DATA DEVICES

(75) Inventors: Hanqing Liao, San Ramon, CA (US); Stephen S. Boyle, Fremont, CA (US)

(73) Assignee: Openwave Systems, Inc., Redwood City, CA (US)

( * ) Notice: Subject to any disclaimer, the term of this patent is extended or adjusted under 35 U.S.C. 154(b) by 0 days.

(21) Appl. No.: 09/113,243

(22) Filed: Jul. 10, 1998

(51) Int. Cl.⁷ .................. G01R 31/08; H04L 12/413
(52) U.S. Cl. .............. 370/252; 370/448; 709/203; 714/749
(58) Field of Search ................ 370/252, 254, 370/255, 280, 465, 466, 453, 487, 347, 342, 310, 328, 350, 314, 320, 321, 335, 337, 503, 508, 521, 507, 401, 402, 230, 448, 445; 375/358; 455/423, 425, 422, 671, 67–6; 714/748, 749; 709/203, 228, 235

(56) References Cited

U.S. PATENT DOCUMENTS

| | | | | |
|---|---|---|---|---|
| 5,819,177 A | * | 10/1998 | Vucetic et al. | 455/425 |
| 5,822,543 A | * | 10/1998 | Dunn et al. | 395/200.54 |
| 5,959,980 A | * | 9/1999 | Scott | 370/280 |
| 6,032,033 A | * | 2/2000 | Morris et al. | 455/277.2 |
| 6,038,216 A | * | 3/2000 | Packer | 370/231 |
| 6,076,114 A | * | 6/2000 | Wesley | 709/235 |

FOREIGN PATENT DOCUMENTS

| | | |
|---|---|---|
| EP | 0 709 982 | 5/1996 |
| WO | 97 35449 | 9/1997 |

OTHER PUBLICATIONS

Xu K. H: "Reliable Stream Transmission Protocols in Mobile Computing Environments" Bell Labs Technical Journal, US, Bell Laboratories, vol. 2, No. 3, Jun. 21, 1997.

"Remote Network Monitoring Management Information Base" RCF 1757, Online! Feb. 1, 1995, XP002113096, Retrieved from the Internet: URL:http://www.cis.ohio-state.edu/htbinrfc/rfc1757.html retrieved on Jan. 31, 2001! *section 2.1, "Remote network management goals"*.

Balakrishnan H et al: "A Comparison of Mechanisms for Improving TCP Performance Over Wireless Links" IEEE/ACM Transaction son Networking,US,IEEE Inc. New York, vol. 5, No. 6. Dec. 1, 1997.

(List continued on next page.)

*Primary Examiner*—Duc Ho
(74) *Attorney, Agent, or Firm*—Blakely, Sokoloff, Taylor & Zafman LLP (57) ABSTRACT

A method and apparatus for dynamically adjusting timing parameters in a wireless data network is disclosed. A server system receives a set of timing statistics that may include a set of timing statistics measured by a wireless client and a set of timing statistics measured by a server device that services the wireless client. The timing statistics reflect the performance of the wireless network. Using the timing statistics and other timing related information such as the type of the wireless networks, the sever device determines a new set of timing parameters to be used by itself and the wireless client device or other client devices. Besides other functional values having impact on the performance of the wireless data network, the timing parameters include an ordered set of numbers that represents a back-off curve for message retransmission. The server device then transmits the new timing parameters respectively to one or more wireless client devices. After receiving the new set of timing parameters, a wireless client device may directly use the timing parameters or further process or readjust the timing parameters using local information so as to derive a set of locally optimized timing parameters for the wireless client device. This practically allows the server to dynamically control the timing and performance behaviors of all the mobile devices it communicate to an optimal degree with minimal efforts.

15 Claims, 5 Drawing Sheets

OTHER PUBLICATIONS

K. Ratnam et al., "Effect of Local Retransmission at Wireless Access Points on the Round Trip Time Estimation of TCP," Proceedings of the 31st Annual Simulation Symposium, Apr. 5–9, 1998, Boston, Massechusetts, IEEE Computer Society, pp. 150–156, Los Alamitos, California, XP 010275542.

W. R. Stevens, "TCP Timeout and Retransmission," vol. 1: The Protocols, Professional Computing Series, pp. 297–337, Reading, Massechusetts, 1994, XP 002223116.

* cited by examiner

METHOD AND APPARATUS FOR DYNAMICALLY CONFIGURING TIMING PARAMETERS FOR WIRELESS DATA DEVICES

FIELD OF THE INVENTION

The present invention relates to the field of wireless data networks. In particular the present invention discloses a method and apparatus for dynamically configuring timing parameters between a client device and a server device in a wireless data network.

BACKGROUND OF THE INVENTION

In a wireless data network, a message exchanging between a sender and a recipient may be lost or delayed for many reasons such as environmental and geographic conditions, network routing problems, or transmitter battery weakness. After sending a message, the sender does not know if the message is lost or still traveling in the wireless data network until an acknowledgement or a response is received from the recipient. To guarantee delivery in a wireless data network, the sender must retransmit the message after a period of time if there is no response or acknowledgement from the recipient. The length of the time before retransmission makes a significant impact on the performance of the wireless communication.

There are many different types of wireless networks. Examples of the wireless networks include Cellular Digital Packet Data (CDPD), Global System for Mobile Communications (GSM), Code Division Multiple Access (CDMA) and Time Division Multiple Access (TDMA). Each network has its unique timing and performance characteristics in terms of data throughput, rate of packet loss, and packet latency. For instance, a CDPD wireless data network provides a relatively high throughput and low latency for data packets whereas an SMS wireless data network provides relatively low throughput and low latency. Based on the timing and performance characteristics, each wireless network is configured uniquely with a set of timing parameters so that the network may perform optimally from a statistic perspective. For example, it is statistically observed that during a specific hour at a specific location, there is a higher percentage that messages in a network are delivered truncated or incompletely. Hence the rate of retransmission is adjusted higher for this specific hour than other hours in the specific location.

In reality, the static or fixed timing parameters do not necessarily improve the network behavior or performance because the conditions for the fixed timing parameters can change any time. With reference to the network traffic, the fixed timing parameters that are optimized for the light traffic or heavy traffic conditions may perform poorly during the heavy traffic or light traffic conditions. It would therefore be desirable to have a wireless data network system that dynamically adjusts itself based upon current conditions.

SUMMARY OF THE INVENTION

A method and apparatus for dynamically adjusting timing parameters in a wireless data network is disclosed. In the method of the present invention, a server device receives a set of timing statistics that may include a set of timing statistics measured by a wireless client and a set of timing statistics measured by the server device that services the wireless client. The timing statistics reflect the performance of the wireless network. Using the timing statistics and other timing related information such as the type of the wireless networks, the sever device determines a new set of timing parameters to be used by itself and the wireless client device or other client devices. Besides other functional values having impact on the performance of the wireless data network, the timing parameters include a minimum initial retransmission interval and an ordered set of numbers that represents a back-off curve for message retransmission.

To make the new set of timing parameters effective, the server device then transmits the new timing parameters respectively to one or more wireless client devices. After receiving the new set of timing parameters, a wireless client device may directly use the timing parameters or further process or readjust the timing parameters using local information so as to derive a set of locally optimized timing parameters for the wireless client device. This practically allows the server device to dynamically control the timing and performance behaviors of all the mobile devices it communicates with to an optimal degree with minimal efforts.

According to one embodiment, the present invention is a method for dynamically adjusting timing parameters for a wireless data network, said method comprising:
  receiving timing statistics at a server device;
  calculating a new set of timing parameters using said timing statistics; and
  transmitting said new set of timing parameters to wireless client devices that operate in said wireless data network;
  wherein the timing statistics are client timing statistics and server timing statistics and the method further comprising:
    measuring the client timing statistics at a client device;
    transmitting the client timing statistics from the client device to the server device.
    collecting the server timing statistics and
    calculating the new set of timing parameters using both the client timing statistics and the server timing statistics.

According to another embodiment, the present invention is a system for dynamically adjusting parameters for a wireless network, the system comprising:
  a wireless data network;
  a plurality of client devices; the plurality of client devices operating in the wireless data network; and
  a server device, the server device coupled to the wireless data network, the server device collecting timing statistics, the server device calculating a new set of timing parameters based upon the timing statistics, the server device transmitting the new set of timing parameters to the plurality of the client devices.

Accordingly, an important object of the present invention is to provide a generic solution that allows wireless devices communicating in a wireless data network to be dynamically adjusted for optimum timing parameters so as to improve the communication or the network performance.

Other objects, features and advantages of the present invention will be apparent from the accompanying drawings and from the following detailed description that follows below.

BRIEF DESCRIPTION OF THE DRAWINGS

The objects, features, and advantages of the present invention will be apparent to one skilled in the art, in view of the following detailed description in which.

DETAILED DESCRIPTION OF THE PREFERRED EMBODIMENT

A method and apparatus for dynamically determining and configuring data network timing parameters is disclosed. In the following description, for purposes of explanation, specific nomenclature is set forth to provide a thorough understanding of the present invention. However, it will be apparent to one skilled in the art that these-specific details are not required in order to practice the present invention. For example, the present invention has been described with reference to cellular telephone data networks. However, the same techniques can-easily be applied to other types of wireless data networks.

Wireless Data Network Timing Parameters

Figure 1A:
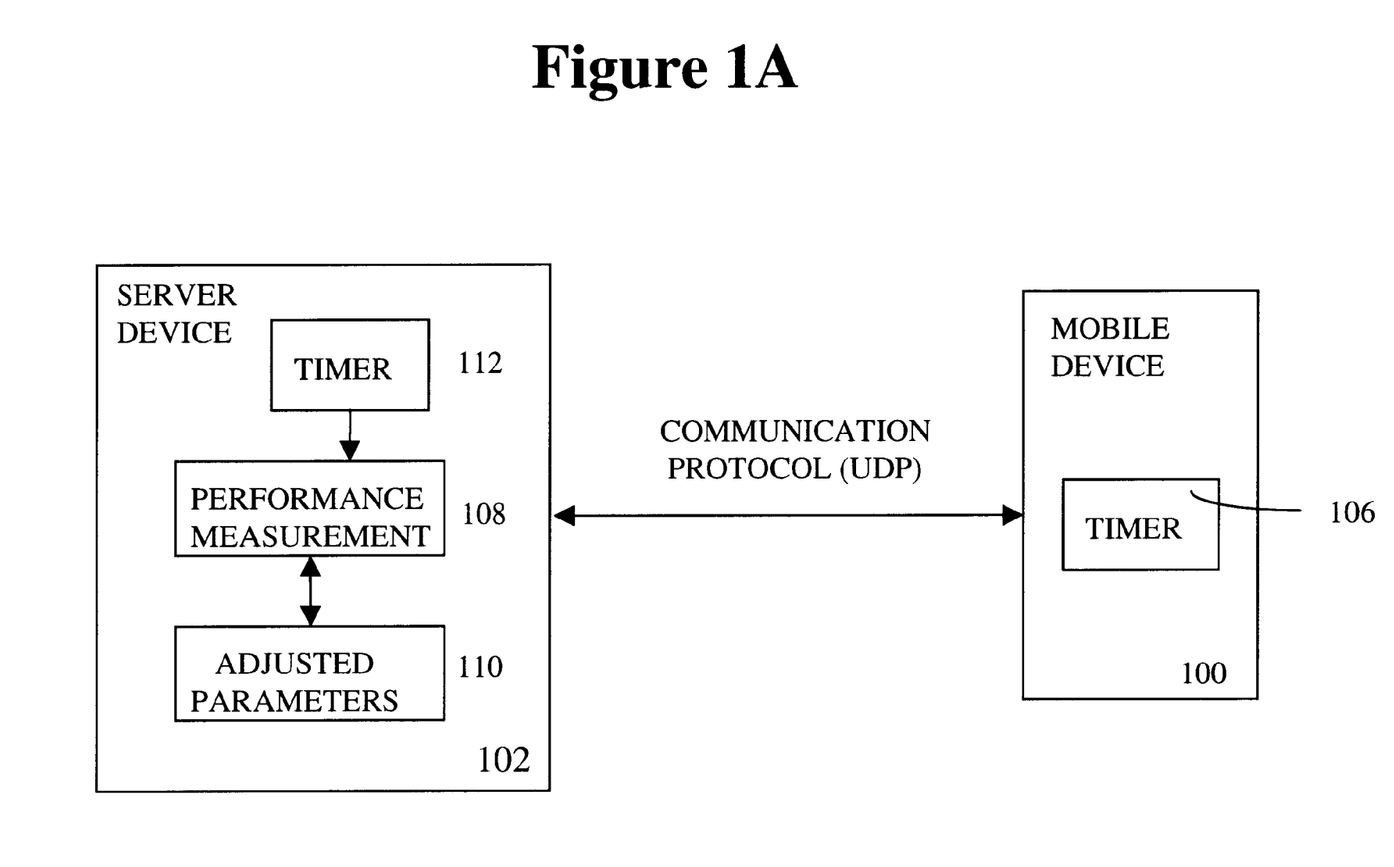
FIG. 1A depicts a configuration in which the present invention may be practiced.

Referring to FIG. 1A, there is depicted a mobile device 100 in communication with a server device 102 over a wireless network 104. Mobile device 100, alternatively referred to as client or client system herein, is one of two-way interactive communication devices that include, but are not limited to, mobile computing devices, cellular phones, palm-sized computer devices with personal data assistant (PDA) functionalities and Internet-capable appliance remote controllers, capable of communicating wirelessly with server device 102 via a carrier infrastructure (not shown in the figure). Server device 102, referred to alternatively as server or server system is a link server, proxy server, wireless data server or network gateway server and may be a workstation or a personal computer. One of the key functions in server 102 is bridging between wireless network 104 and the Internet so that mobile device 100 may communicate with any devices coupled to the Internet. Wireless network 104 may be any of the wireless networks such as CDPD, TDMA, CDMA or GSM.

The communication protocol in wireless network 104 is typically a wireless communication protocol, examples thereof including Handheld Device Transport Protocol (HDTP) (formerly known as Secure Uplink Gateway Protocol (SUGP)) from Unwired Planet, Inc. located at 800 Chesapeake Drive, Redwood City, Calif. 94063. Compared to communication protocols commonly used in the Internet, wireless communication protocol is typically a session-level protocol that resembles HTTP but without incurring the overhead thereof. The example, HDTP, preferably running on User Datagram Protocol (UDP), is highly optimized for use in thin devices, such as mobile station 100, that have significantly less computing power and memory than that in a desktop personal computer. Further, a wireless communication protocol typically does not require a connection to be established between a client and a server before information can be exchanged, which eliminates the need of exchanging a large number of packets during a session creation between the client and the server.

Figure 1B:
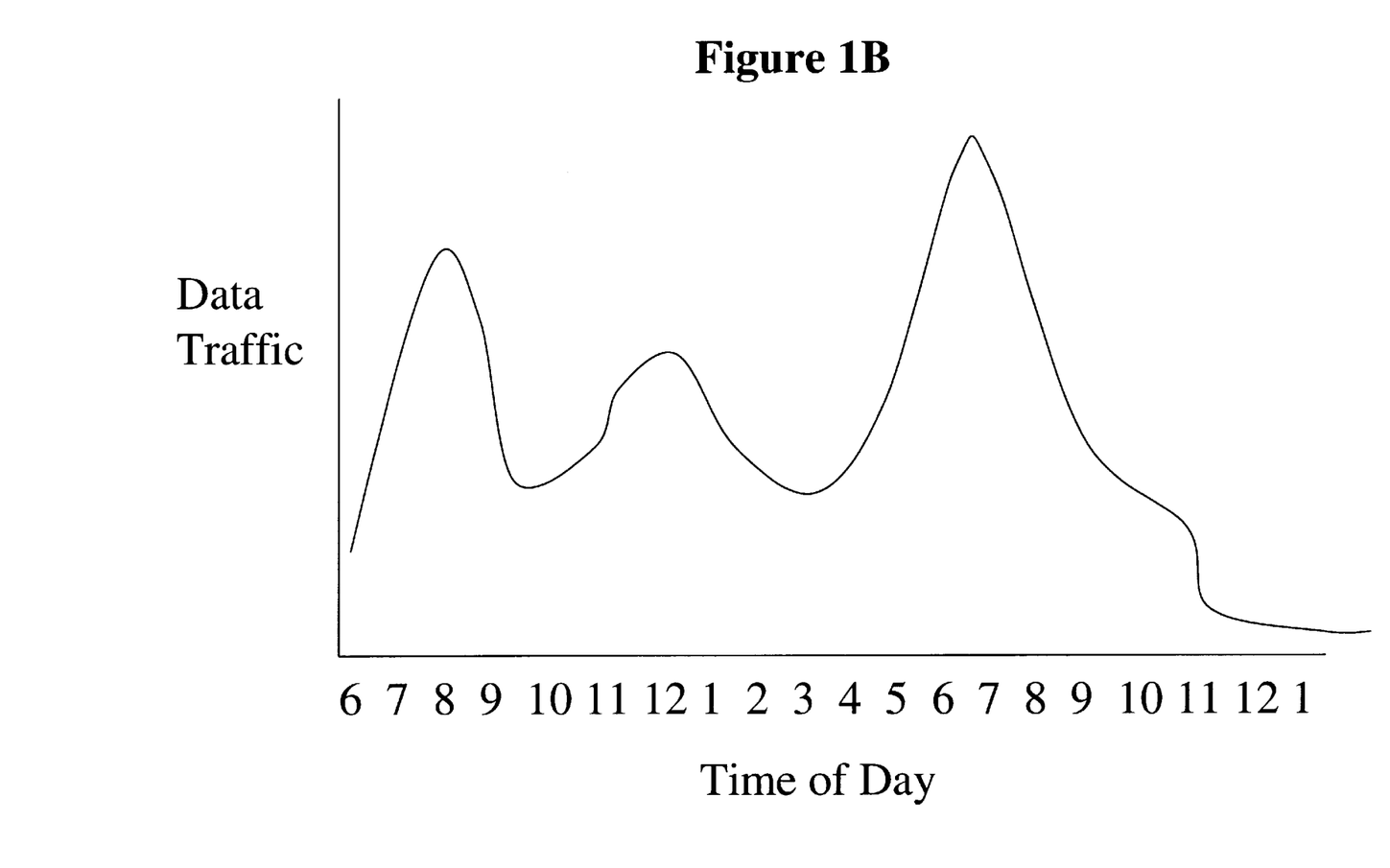
FIG. 1B illustrates a graph plotting wireless traffic versus time of day.

According to one aspect of a wireless data network, the current traffic conditions of the wireless data network dynamically alter the performance of the wireless data network. FIG. 1B illustrates a graph that plots the data traffic carried by one possible wireless data network against the time of day. In the early morning commute hours, the wireless network traffic becomes heavy but drops lower once normal business hours begin. At lunchtime, the traffic again increases. Finally, just before dinner time and during the evening commute, the data traffic becomes very heavy. During these peak times, mobile phone users may experience packet loss or increased packet latency. To prevent heavy traffic from overloading the network, it would be desirable to alter the timing parameters used by the base stations and mobile clients during such periods.

The timing parameters of a wireless data network can be any values directly or indirectly used in the communication protocols between a mobile device and a server device, which have timing and performance impact on the quality of communication. The timing parameters may include values for implementing retransmission back-off, value for starting the initial retransmission, etc. For instance, if the time period between successive retransmissions is too short, the wireless devices will generate the excessive network traffic and slow down the whole wireless network. Alternatively, if the time period between successive retransmissions is too large, the performance observed by the mobile device user will be poor because of packet loss and packet latency in the wireless data network.

To facilitate the description of the present invention, the timing parameters are collectively focused on a certain set that is affected by network traffic. The particularity implies no limitations of the present invention thereto and in fact it will become apparent to those skilled in the art that the present invention can be equally applied to timing parameters affected by other factors, such as message lengths and frequency of use of a device, and location of a device in a network.

Configuring Timing Parameters

As described above, static timing parameters are inefficient because the static parameters can not handle dynamic conditions well. For instance, a simple back-off strategy based on a particular exponential function that is hard-coded in a mobile device would perform satisfactorily during normal conditions but would not be effective when the traffic conditions change or when the device is roaming into a different network. Computing the timing parameters based on the performance/traffic statistics on one side of the communication is difficult for small mobile devices with limited computational capabilities and does not achieve optimal results.

The present invention introduces the technique of dynamically downloading and uploading timing parameters between a server and a client. As shown in FIG. 1A, server 102 may be heavily involved in the process of selecting the timing parameters while client 100 may be only lightly involved. More specifically, mobile device 100 comprises a timer 106 that records various time values (statistics) and supplies the values to server device 102. Upon receiving the time statistics, server device 102 calculates the performance with respect to a set of certain criteria in 108 and determines, if not satisfactory, a new set of timing parameters that need to cause both devices to act the best given the circumstance.

This practically allows the server to dynamically control the timing and performance behaviors of all the mobile devices it communicates to an optimal degree with minimal efforts.

According to one embodiment, the mobile device may send its timing statistics to a server at any time. The timing statistics may be sent alone or along with a normal data message sent by the client. The timing statistics may include the processing time needed after a client receives a server message and the round-trip time statistically observed by the client from the client to the server. Specifically, one of time statistics in the mobile device is the roundtrip time that is the time elapsed after the client sends a client message to the server until the server message, as the response to the client message, is received from the server. It is also known as the response time. It should be noted that the roundtrip time generally include the travel times for both the client and the response server message and the processing time at the server for the client message.

The server collects, stores, and analyzes timing related information (time statistics) sent from the mobile clients. The server also collects and analyzes its own timing related information from measurements that the server routinely makes. The server also allows an operator of the server to enter adjustments to the timing related information including selection of the curves for the back-off retransmission At the minimum, the server calculates the initial value for retransmission and the curve of the back-off timing. The server can represent any curve in-an ordered set of numbers. The server can use any curve generated from any known mathematical formula such as exponential functions or any curve which is generated through experimental statistics and does not necessarily have a simple mathematical formula.

With the collected timing statistics and other timing related information, the server may decide to modify the timing parameters for one or more clients. To modify the timing parameters of one client, the server can send a new set of timing parameters in a server message to the client. The new timing parameters may be sent alone for purpose of modifying the timing parameters of the client or the timing parameters may be sent together with another message to the client.

Upon receiving new timing parameters from a server message, the client may use the timing parameters directly. Alternatively, the client may process the timing parameters according to a predefined procedure.

Dynamic Timing Parameter Adjustment

Figure 2:
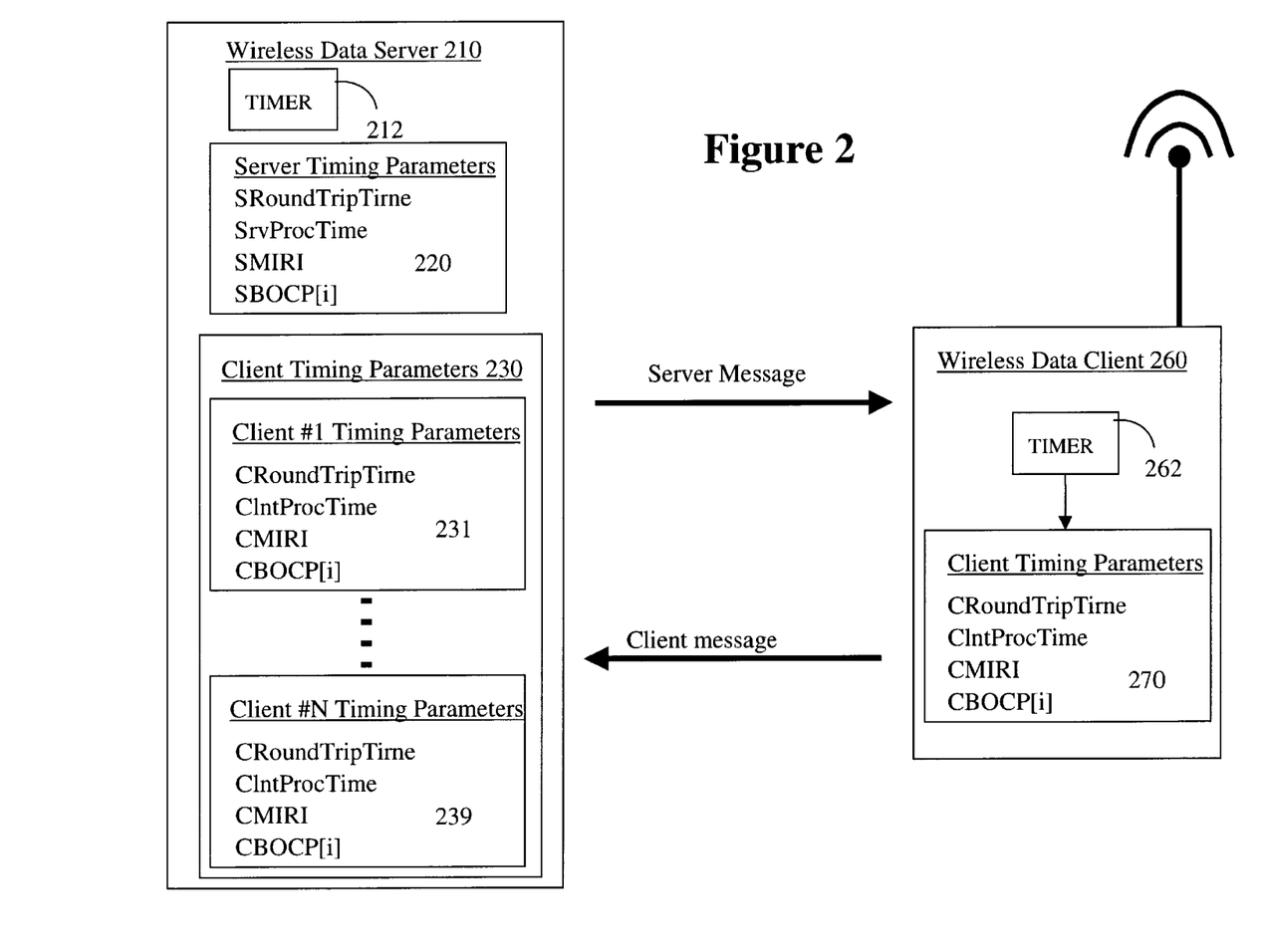
FIG. 2 illustrates a block diagram of a dynamically adjustable wireless data network.

FIG. 2 illustrates a conceptual block diagram that describes how the client and server of the present invention interact to dynamically set the timing parameters. Referring to FIG. 2, a block diagram of a server 210 corresponding to server device 102 of FIG. 1 is illustrated. Furthermore, one mobile device 260 is illustrated although there may be many mobile devices.

In one embodiment, timer 262 in mobile client system 260 measures the time it takes a message to make a round trip from the client to the server and back (CRoundTripTime). The CRoundTripTime value is measured by timing how long it takes to receive a server response message to a client message after the client message is sent to server 210. Additionally timer 262 also measures the processing time the client takes to respond to any server message after it receives the server message (ClntProcTime).

As shown in FIG. 2, client 260 maintains at least two types of timing values that can be subsequently used to control the network performance. The first timing value is Client Minimum Initial Retransmission Interval (CMIRI). CMIRI determines how long client 260 waits before retransmitting a message for which no acknowledgement or server response message has been received. Client 260 also maintains a set of Back-off Curve Points (CBOCP[i], where i=1, 2, 3, 4, 5). The back-off curve points determine how long client 260 waits before attempting successive retransmissions. According to one embodiment, to calculate the ith retransmission timer value (CRTV[i]) the following equation is used:

$$CRTV[i]=Max(CMIRI, CRoundTripTime)*CBOCP[i]$$

where Max( ) means taking a larger value in the parenthesis.

Server 210 also maintains similar types of timing values. In one embodiment, timer 212 in server 210 maintains the time it takes to receive a client response message after a server message is sent to the client (SRoundTripTime) and the time processing time required by the server to respond to a client message (SrvProcTime). Similarly, server 210 maintains a timing value that can be subsequently used to control the network performance: a server Minimum Initial Retransmission Interval (SMIRI) and a set of server Back-off Curve Points (SBOCP[i], where i=1, 2, 3, 4, 5). To calculate the ith server retransmission timer value (RTV[i]) the following equation is used:

$$SRTV[i]=Max(SMIRI, SRoundTripTime)*SBOCP[i]$$

It is understood that server 210 services a large number of mobile devices simultaneously and optionally may service mobile devices working in different wireless networks. According to one embodiment, a set of timing parameters for each mobile device are stored as shown in FIG. 2. By maintaining a separate copy of the various timing parameters for each of the clients, the server can determine when and if the timing parameters should be changed for a particular client. Similarly, a client may keep a table comprising the timing parameters for each of possible wireless networks or servers that it may have been assigned to. For example, a client may be able to work in CDMA and optionally in GSM network. A set of timing parameters adjusted optimally for the CDMA network may not be necessarily the best for the GSM network, hence a separate set of timing parameters are typically maintained.

In the conceptual diagram of FIG. 2, mobile device 260 may send a client message to the server. Similarly, server device 210 may send a server message to the mobile client device. A server message can be a response to a client message while a client message may be a response to the server message. It is also possible that the client message and a server message are not related at all. It can be appreciated that the timing statistics can be exchanged between mobile device 260 and server device 210 by either being sent as a message or piggybacked in the client or server message.

An Example: Dynamic Timing Parameter Adjustment

Figure 3:
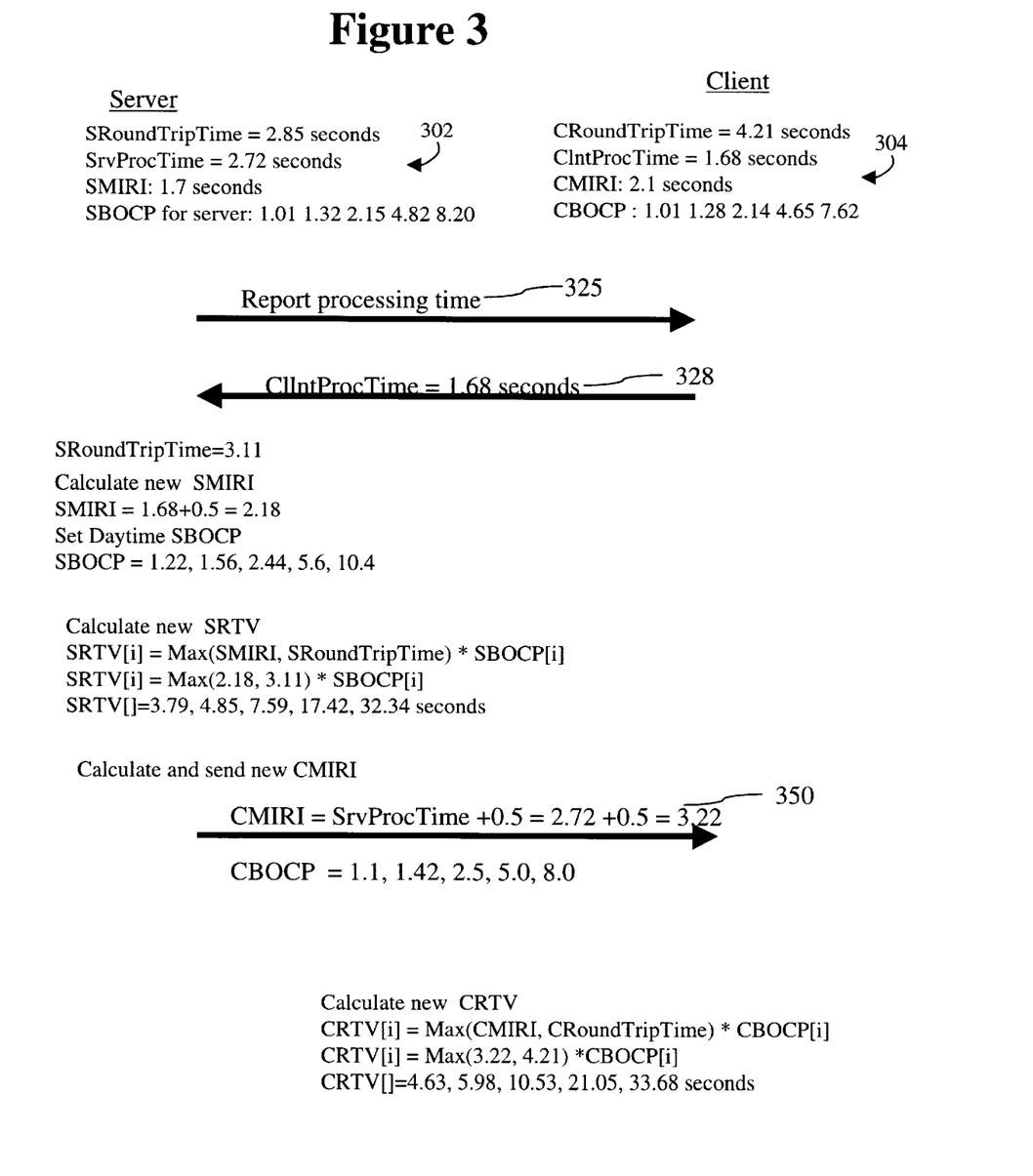
FIG. 3 illustrates an example of data flow between a server and a client (mobile device) when timing parameters are changed.

FIG. 3 illustrates an example of the dynamic timing parameter adjustment system of the present invention. The example of FIG. 3 is for illustrative purposes only, there are many possible modifications and alternative embodiments.

Referring to FIG. 3, both a server system and client system begin with a set of initial timing parameters 302 and 304 including measured round-trip times, local processing times, minimum initial retransmission intervals, and back-off curve points. Then the server determines when is the time for the timing parameters to be adjusted. Such timing readjustment parameters may occur at well defined times, at known intervals, or when timing parameter changes are deemed necessary due to performance degradation. In the example of FIG. 3, it will be assumed that the timing parameter adjustment is being initiated due to a change from nighttime hours to peak daytime hours. To initiate the timing parameter adjustment, the server sends a message 325 requesting the client's processing time.

The client responds to the request message by sending the client processing time back in message 328. The server systems receives and records the client's processing time. Furthermore, when the server system receives the client response message, the server measures and then updates the round-trip time of the server message (SRoundTripTime).

Using the received and measured timing statistics, the server system calculates a new set of timing control parameters. First, the server determines a new server minimum initial retransmission interval (SMIRI). The server minimum initial retransmission interval (SMIRI) is determined by adding client processing time (ClntProcTime=1.68 seconds) to the server's minimum estimation on the combined travel time required for a client message and the response server message. The minimum estimation is selected 0.5 second in the example.

Next, the server sets the server back-off curve points (SBOCP) to a set of predetermined daytime back-off curve points. These daytime back-off curve points have been optimized for daytime high volume traffic. It should be understood that the curve points may be calculated based on the measured timing parameters or modified by an operator at any time.

Finally, the server calculates its server retransmission time values (SRTV) for the successive retries. The server retransmission time values (SRTV) are calculated using the formula $SRTV[i]=Max(SMIRI, SRoundTripTime) * SBOCP[i]$.

After determining its own recalculated timing parameters, the server sends new timing parameters to the client system. It should be noted that since the server determines new timing parameters for the client system, the processing that needs to be performed by the client system is minimized. The server sends a new client minimum initial retransmission interval and new daytime client back-off curve points to the client system in message 350. In the embodiment of FIG. 3, the new client minimum initial retransmission interval is calculated by taking the server processing time and adding half a second, which is the server's minimum estimation of the combined travel time for the client message and the server response message.

The client system receives the new timing parameters in message 350. The client system would examine message 350 to see if there is an indicator that informs the client system on how the new timing parameters should be interpreted. For example, the message may include an indicator that describes how the client system should further process the timing parameters using local data such as updated network traffic information.

In the example of FIG. 3, the client system just stores the new CMIRI and CBOCP[] values. The client system then recalculates a new set of client retransmission time values (CRTV). Specifically, the client retransmission time values (CRTV) are calculated using the formula $CRTV[i]=Max(CMIRI, CRoundTripTime)*CBOCP[i]$. In the example of FIG. 3, the client will retransmit the same client message 4.63 seconds after the original client message is sent and if the expected server response is not received. The second retransmission happens 5.98 seconds after the first retransmission, and so on. Finally, the client may retransmit the client message every 33.68 second before the client eventually gives up.

In one embodiment, the received server message will prompt the client system to calculate a new client round-trip time (CRoundTripTime) value that will be used to calculate new client retransmission time values (CRTV). When the change in CRoundTripTime exceeds a threshhold value, the client retransmission time values will recalculated.

As described above the client may communicate with more than one server system or operate in different networks. In such embodiment, the client system may maintain a table or database of timing parameters for all the different settings.

Figure 4:
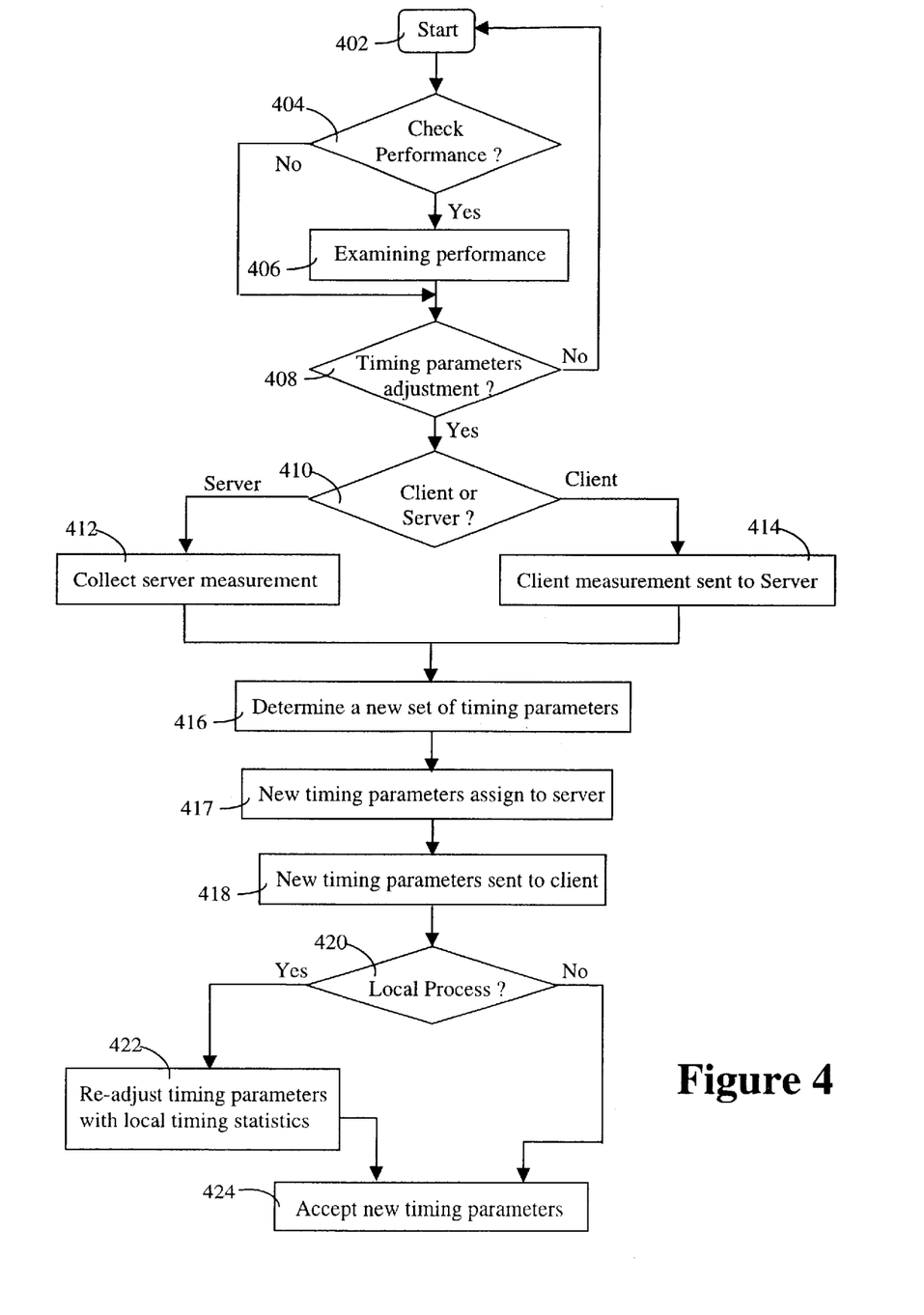
FIG. 4 illustrates a process flowchart of dynamically reconfiguring timing parameters between a client and a server according to one embodiment of the present invention.

Referring now to FIG. 4, there is shown a process flowchart 400 of dynamically configuring timing parameters for a client and a server over a wireless network according to one embodiment. FIG. 4 shall be understood in conjunction with the rest of the figures. As described above, reconfiguration of the timing parameters may happen due to many reasons and network performance degradation may be one of the reasons that triggers the start of reconfiguring timing parameters to improve communication performance over the wireless network. At 404, reconfiguring timing parameters may be started due to the performance degradation or other reasons. If it is not started by the performance degradation, for example, it may be started by a specific time interval, the process proceeds to 408 to determine if it is time to reconfigure timing parameters.

When reconfiguring timing parameters is started by the performance degradation, the actual performance measurement is performed at 406, including calculating message roundtrip time and process time. It can be appreciated from the above description that the performance degradation may happen at either the client side or server side, hence the actual performance examination is conducted independently, respectively and accordingly. To be more specific, when the performance degradation is happening in the client, the performance examination is only initiated in the client. Conversely, the performance examination is only initiated in the server when the performance degradation is happening in the server.

At 408, a decision to make timing parameters adjustment is made based on the results from the performance examination at 406 or simply proceeded at the specified time interval. As described above, the client or the server may each start the reconfiguration of timing parameters. So the process at 410 goes with the one that started the reconfiguration. If the client started, the time statistics measured by the client will be sent to the server, either as a separate message or being piggybacked in a client message to the server, for determining a new set of timing parameters for both the server and the client at 416. Similarly, if the sever started, the time statistics measured by the server will be collected for determining a new set of timing parameters for both the server and the client at 416. The server may request the client to send the timing statistics to the server to determine the new set of timing parameters for both the server and/or the client.

At 417, the newly determined timing parameters are set to the server and meanwhile, the newly determined timing parameters are sent to the client over the wireless network at 418. Typically there is a flag that goes with the newly determined timing parameters sent to the client. The flag indicates to the client how to interpret the timing parameters. Although the flag is not necessarily needed to practice the invention, it provides efficient means for better managing the timing parameters. Hence when the new timing parameters arrive in the client, if the flag indicates the new timing parameters must be accepted as is, which usually happens when the reconfiguration is initiated by the time interval, the client resets all the timing parameters with the new ones at 424 and subsequently performs accordingly. If the flag indicates that a further local process is required, the client generally readjust the timing parameters with respect to the updated local timing statistics, this allows the client to adjust according to the current updated traffic conditions so as to derive a set of optimum local timing parameters. For example, when the client gets a new set of timing parameters that include a new back-off curve and CMIRI from the server, the client needs to calculate its CRTV values. Nevertheless, the new timing parameters, which may include the locally readjusted timing parameters, are installed at 424.

The foregoing has described a method and apparatus for dynamically determining wireless data network timing parameters. It is contemplated that changes and modifications may be made by one of the ordinary skills in the art, to the materials and arrangements of elements of the present invention without departing from the scope of the invention.

We claim:

1. A method for implementing retransmission back-off in a wireless data network comprising at least one wireless client device and a server device, the method comprising:
   receiving client timing statistics from the at least one wireless client device;
   estimating a server roundtrip travel time, the server roundtrip travel time comprising a travel time for a message from the server device to the at least one wireless client device, a travel time for a response to the message from the at least one wireless client device to the server device, and a processing time for the at least one wireless client device to process the message from the server device;
   measuring an actual server roundtrip travel time for the message and the response; and
   calculating a set of server retransmission time values/for retransmitting unacknowledged server device messages to the at least one wireless client device based on the client timing statistics, the estimated server roundtrip travel time, and the actual server roundtrip travel time.

2. The method of claim 1, wherein the client timing statistics comprises processing times for the at least one wireless client device to process server device messages, calculating the server retransmission time values then comprising using the formula SRTV [i]=Max (SMIRI, SRoundTripTime)×SBOCP [i], wherein SRTV [i] is the ith server retransmission time value, SMIRI is the estimated server roundtrip travel time, SRoundTripTime is the actual server roundtrip travel time, SBOCP [i] is the ith data point along a server back-off curve, and Max(SMIRI, SRoundTripTime) returns a maximum of SMIRI and SRoundTripTime.

3. The method of claim 2 further comprising calculating client retransmission time values for retransmitting unacknowledged client messages from the at least one wireless client device to the server device; and
   transmitting the client retransmission time values to the at least one wireless client device.

4. The method of claim 3, wherein the client timing statistics comprise actual client roundtrip travel times for a message from the at least one wireless client device to the server device and for a response to the message from the server device to the at least one wireless client device, calculating the client time values then comprising using the formula CRTV[i]=Max(CMIRI, CRoundTripTime)×CBOCP[i], wherein CRTV[i] is the ith client retransmission time value, CMIRI is an estimate for a client roundtrip travel time, CRoundTripTime is an actual client roundtrip travel time for the message, CBOCP[i] is the ith value on a back-off retransmission curve for the at least one wireless client device, and Max(CMIRI, CRoundTripTime) returns a maximum of CMIRI and CRoundTripTime.

5. The method of claim 2, further comprising calculating points on a back-off curve for the at least one wireless client device and transmitting these points to the at least one wireless client device.

6. The method of claim 5, further comprising estimating a client roundtrip travel time for a message from the at least one wireless client device to the server device and for a response thereto from the server device to the at least one wireless client device; and transmitting the estimated client roundtrip time to the at least one wireless client device.

7. A method for implementing retransmission back-off in a wireless data network, the method comprising:
   monitoring a performance of the wireless data network; and
   adjusting retransmission time values for a component in the wireless data network if the performance of the wireless data network falls below a threshold, wherein existing retransmission timing values for the component are recalculated based on the performance of the wireless data network, and wherein the recalculated retransmission timing values define a set of points on a retransmission back-off curve for the component, each point being a time value at which the component retransmits unacknowledged messages.

8. The method of claim 7, wherein monitoring the performance of the wireless data network comprises collecting statistics indicating processing times for the component to process messages.

9. The method of claim 8, wherein monitoring the performance of the wireless data network comprises collecting statistics indicating round trip travel times for communications comprising message-reply pairs from and to the component.

10. The method of claim 9, wherein the calculating is performed by the server device.

11. The method of claim 10, wherein the adjusting is performed by the wireless client device based on the set of points on the retransmission back-off curve for the wireless client device.

12. The method of claim 7, wherein the component comprises a server device or a wireless client device, adjusting the retransmission timing values then comprising calculating a set of points on a retransmission back-off curve for the server device or the wireless client device.

13. The method of claim 12, further comprising transmitting the set of points on the retransmission back-off curve for the wireless client device to the wireless client device.

14. The method of claim 13, wherein the adjusting comprises using the formula CRTV[i]=Max(CMIRI, CRoundTripTime)×CBOCP[i], wherein CRTV[i] is the ith client device retransmission time value, CMIRI is an estimate for a roundtrip travel time for a client-message, server-response pair, CRoundTripTime is an actual measured roundtrip time for the client-message, server-response pair, CBOCP[i] is the ith point on the retransmission back-off curve for the wireless client device; and Max(CMIRI, CRoundTripTime) returns a maximum of CMIRI and CRoundTripTime.

15. The method of claim 12, wherein adjusting the recalculation timing values is performed by the server device in accordance with the formula SRTV[i]=Max SMIRI, SRoundTripTime)×SBOCP[i], wherein SRTV[i]) is the ith server retransmission time value SMIRI is an estimate for a roundtrip travel time for a server-message, client-response pair, SRoundTripTime is a measured roundtrip travel time for the server message-client response pair, SBOC[i] is the ith point on the retransmission back-off curve for the server device and Max(SMIRI, SRoundTripTime) returns a maximum of SMIRI and SRoundTripTime.

* * * * *